(12) United States Patent
Ueno

(10) Patent No.: US 11,790,700 B2
(45) Date of Patent: Oct. 17, 2023

(54) RELEARNING NECESSITY DETERMINATION METHOD AND RELEARNING NECESSITY DETERMINATION DEVICE OF DIAGNOSTIC MODEL IN MACHINE TOOL, AND COMPUTER READABLE MEDIUM

(71) Applicant: OKUMA CORPORATION, Niwa-Gun (JP)

(72) Inventor: Hiroshi Ueno, Niwa-Gun (JP)

(73) Assignee: Okuma Corporation, Niwa-Gun (JP)

(*) Notice: Subject to any disclaimer, the term of this patent is extended or adjusted under 35 U.S.C. 154(b) by 478 days.

(21) Appl. No.: 16/927,354

(22) Filed: Jul. 13, 2020

(65) Prior Publication Data
US 2021/0019958 A1    Jan. 21, 2021

(30) Foreign Application Priority Data

Jul. 18, 2019  (JP) ................ 2019-133012

(51) Int. Cl.
*G07C 3/08* (2006.01)
*G06N 20/00* (2019.01)
(Continued)

(52) U.S. Cl.
CPC ............. *G07C 3/08* (2013.01); *G05B 19/182* (2013.01); *G05B 19/4065* (2013.01); *G06N 20/00* (2019.01)

(58) Field of Classification Search
CPC .... G07C 3/08; G05B 19/182; G05B 19/4065; G05B 2219/37245; G05B 2219/49307; G05B 19/406; G06N 20/00
See application file for complete search history.

(56) References Cited

U.S. PATENT DOCUMENTS 11,287,801 B2 *   3/2022   Oho ................ G06N 20/00
2014/0257717 A1   9/2014   Kumazaki et al.
(Continued)

FOREIGN PATENT DOCUMENTS

JP    6178591 B2      8/2017
JP    2017-220111 A1  12/2017
JP    6426667 B2      11/2018

OTHER PUBLICATIONS

Partial machine translation of Shimoda et al. ("Generalized Tool-Life Equation Based on Tool-Life Distributions"; J Jpn Ind Manage Assoc 50, 49-57, 1999) (Year: 1999).*

(Continued)

*Primary Examiner* — Roy Y Yi
*Assistant Examiner* — Geoffrey T Evans
(74) *Attorney, Agent, or Firm* — BURR PATENT LAW, PLLC

(57) ABSTRACT

A relearning necessity determination method is provided for determining a necessity of relearning of a learned diagnostic model in a machine tool including a machining abnormality diagnosing unit. The machining abnormality diagnosing unit determines normal or abnormality of machining using the diagnostic model generated through machine learning. The method includes storing a cumulative cutting time or a cumulative cutting distance of a tool mounted to the machine tool as a tool usage, storing the tool usage when the machining abnormality diagnosing unit diagnoses the machining as machining abnormality, and determining the necessity of the relearning of the diagnostic model based on a frequency distribution of the tool usage stored in the storing of the tool usage.

7 Claims, 6 Drawing Sheets

(51) Int. Cl.
    *G05B 19/18*     (2006.01)
    *G05B 19/4065*     (2006.01)

(56) References Cited

U.S. PATENT DOCUMENTS

2017/0357243 A1     12/2017     Takayama et al.
2019/0210176 A1     7/2019     Yamamoto

OTHER PUBLICATIONS

Human translation of "Generalized Tool-Life Equation Based on Tool-Life Distributions"; J Jpn Ind Manage Assoc 50, 49-57, 1999 (Year: 1999).*
Yukio Shimoda, et al., "Generalized Tool-Life Equation Based on Tool-Life Distributions," *Journal of Japan Industrial Management Association*, vol. 50, No. 1, 1999, pp. 50-57.
F. W. Taylor, "On the Art of Cutting Metals," *Transactions of the American Society of Mechanical Engineers*, New York Meeting, 1906, vol. 28, pp. 162-163.

* cited by examiner

RELEARNING NECESSITY DETERMINATION METHOD AND RELEARNING NECESSITY DETERMINATION DEVICE OF DIAGNOSTIC MODEL IN MACHINE TOOL, AND COMPUTER READABLE MEDIUM

BACKGROUND OF THE INVENTION

This application claims the benefit of Japanese Patent Application Number 2019-133012 filed on Jul. 18, 2019, the entirety of which is incorporated by reference.

TECHNICAL FIELD OF THE INVENTION

The disclosure relates to a method and a device that determine necessity of relearning of a learned diagnostic model in a machine tool having a machining diagnosis function using machine learning technique and a relearning necessity determination program.

DESCRIPTION OF RELATED ART

To perform machining on a workpiece with a cutting tool, tool damage, such as a breakage of the cutting tool, occurs in some cases due to overload, biting of chips, a progress of wear of a cutting edge, or the like. Then, not only that intended machining cannot be achieved and time for re-machining is required, but also product defect occurs, resulting in a loss. Additionally, generation of cutting residue causes a danger of collision between a machine and the workpiece. To avoid the above-described danger, a technique that detects machining abnormality and stops the machine has been proposed.

Japanese Patent No. 6178591 describes a technique in which a motor load waveform during normal machining or the like is preliminarily recorded as a reference waveform, and when a load during machining deviates from the reference waveform by a certain amount or more, it is regarded as machining abnormality. Since the technique allows employing the waveform during normal machining in target machining as the reference, machining abnormality can be detected under any given machining condition. On the other hand, since the deviation from the reference waveform is used as an index, the reference waveform needs to be obtained in advance by test machining or the like, and when the machining condition changes, resetting is necessary. Additionally, determination on an appropriate threshold for how much deviation from the reference waveform for judging abnormality is difficult.

In response to the above-mentioned issues, Japanese Patent No. 6426667 and Japanese Unexamined Patent Application Publication No. 2017-220111 have been disclosed as techniques to solve the issues using machine learning. Japanese Patent No. 6426667 describes a tool abnormality-detecting device using machine learning technique and JP-A-2017-220111 describes a method to learn a threshold for determining machining abnormality.

Misdiagnosis is an unavoidable issue in diagnosis using machine learning. When misdiagnosis occurs, a method either of adjusting the threshold or relearning the diagnostic model is employed. However, relearning the model requires a large amount of high-quality data, makes technical and temporal load large, and brings a risk of over-learning, and therefore avoiding the relearning as much as possible is desired. To do so, how estimate the necessity of relearning becomes important.

The misdiagnosis can be roughly classified into two kinds. One is over-detection (also referred to as false-positive, type I error) and the other is missing (also referred to as false-negative, type II error). An increase in threshold increases the missing, and conversely a decrease in threshold increases the over-detection. As long as a diagnostic model that allows correctly separating normal from abnormality can be provided, setting the appropriate threshold allows correct diagnosis. However, in a case where the diagnostic model learns insufficiently, adjusting the threshold does not lead to improvement in performance, and thus relearning of the model is necessary. As described above, since the relearning of the model applies large load, it is important to distinguish whether misdiagnosis is due to an issue of the threshold or an issue of the diagnostic model when the misdiagnosis occurs.

For example, the missing leads to machine abnormally, such as collision, and a discovery of product abnormality in the subsequent inspection processing, and therefore the occurrence of missing is instantaneously proved. Therefore, a procedure can be employed in which, for example, the threshold is attempted to be adjusted on the spot and when solving the issue is difficult, the processing proceeds to the relearning. By comparison with a history of past degrees of abnormally, it can be determined whether the over-detection increases when the threshold is decreased to avoid the missing, and thus the necessity of relearning is easily determined.

Meanwhile, the circumstance is different in the case of over-detection. The reason is that the over-detection is less likely to be proved compared with the missing. Machining diagnosis stops the machining at a stage where a sign of abnormally is observed to avoid damage of the tool and the product, and therefore even when the tool is observed at the time point, the presence/absence of abnormally is difficult to be found at first glance. Although a person of experience can made determination in some cases, the number of persons of experience is limited in a production site with increased automatization, and also, for example, checking the tools one by one visually is realistically difficult. Accordingly, when a diagnostic function diagnoses the machining as "abnormal," the tool is exchanged with no condition in most cases. Accordingly, a case where the over-detection is proved at the production site is rare, and thus the tools that can be still used are continuously replaced without aware of the over-detection. Continuation of the situation results in an increase in tool cost, and a possibility of over-detection is perceived of at the time. However, when the increase in tool cost become obvious, considerable amount of time has passed from the machining suspicion of over-detection. Distinction that whether an unnecessary increase in tool replacement frequency by over-detection increases the tool cost, or a machining condition, a state of the machine, or the like actually increases damage of the tool at the time point is extremely difficult. If the relearning is forcedly performed while the determination cannot be made on whether the over-detection is caused by the issue of the threshold or deficiency in the diagnostic model, over-learning and incorrect learning may occur, in addition to a temporal loss and a loss in cost, and thus possibly further increasing the damage.

Therefore, an object of the disclosure is to provide a method and a device that ensure appropriate determination whether relearning of a diagnostic model is necessary in a situation where there is a likelihood of over-detection in machining abnormality diagnosis of a machine tool, and a relearning necessity determination program.

SUMMARY OF THE INVENTION

As a relational expression expressing life of a tool, the Taylor's equation for tool life (see Taylor, F. W.: "On the Art of Cutting Metals," Trans. ASME, Vol. 28, pp. 31-350 (1906)) is known. It has been known that, when taking a variation of progress of tool wear into consideration, the variation of the tool life to cutting time follows a logarithm normal distribution (see "Generalized Tool-Life Equation Based on Tool-Life Distributions," Shimoda, et al. Journal of Japan Industrial Management Association, Vol. 50, No. 1, pp. 50-57 (1999)).

From the points, the inventor focused that, when progress of tool wear increases a degree of abnormality of machining, cutting time or a cutting distance at which the degree of abnormality reaches a certain value follows a logarithm normal distribution, thus completing the disclosure.

In order to achieve the above-described object, a relearning necessity determination method according to a first aspect of the disclosure is provided. The relearning necessity determination method is provided for determining a necessity of relearning of a learned diagnostic model in a machine tool including a machining abnormality diagnosing unit. The machining abnormality diagnosing unit determines normal or abnormality of machining using the diagnostic model generated through machine learning. The method includes storing a cumulative cutting time or a cumulative cutting distance of a tool mounted to the machine tool as a tool usage, storing the tool usage when the machining abnormality diagnosing unit diagnoses the machining as machining abnormality, and determining the necessity of the relearning of the diagnostic model based on a frequency distribution of the tool usage stored in the storing of the tool usage.

In a relearning necessity determination method according to a second aspect of the disclosure, in the determining of the necessity, when the frequency distribution of the tool usage stored in the storing of the tool usage follows a logarithm normal distribution, the relearning of the diagnostic model is determined as unnecessary.

In a relearning necessity determination method according to a third aspect of the disclosure, before performing the determining of the necessity, input of an assumed probability of occurrence of sudden machining abnormality is received. In the determining of the necessity, samples by an amount of the assumed probability received at the receiving input are preliminarily removed from samples of the frequency distribution of the tool usage stored in the storing of the tool usage. Subsequently, remained samples are applied to the logarithm normal distribution.

A relearning necessity determination device according to a fourth aspect of the disclosure is provided. The relearning necessity determination device determines a necessity of relearning of a learned diagnostic model in a machine tool. The relearning necessity determination device includes a machining abnormality diagnosing unit, a tool usage storing unit, a tool-usage-at-abnormality-diagnosis storing unit, and a relearning necessity determining unit. The machining abnormality diagnosing unit is configured to determine normal or abnormality of machining using the diagnostic model generated through machine learning. The tool usage storing unit is configured to store a cumulative cutting time or a cumulative cutting distance of a tool mounted to the machine tool as a tool usage. The tool-usage-at-abnormality-diagnosis storing unit is configured to store the tool usage when the machining abnormality diagnosing unit diagnoses the machining as machining abnormality. The relearning necessity determining unit is configured to determine the necessity of the relearning of the diagnostic model based on a frequency distribution of the tool usage stored in the tool-usage-at-abnormality-diagnosis storing unit.

In a relearning necessity determination device according to a fifth aspect of the disclosure, the relearning necessity determining unit is configured such that when the frequency distribution of the tool usage stored in the tool-usage-at-abnormality-diagnosis storing unit follows the logarithm normal distribution, the relearning necessity determining unit determines that the relearning of the diagnostic model is unnecessary.

A relearning necessity determination device according to a sixth aspect of the disclosure, further includes a sudden abnormality probability receiving unit configured to receive input of an assumed probability of occurrence of sudden machining abnormality. The relearning necessity determining unit is configured to preliminarily remove samples by an amount of the assumed probability received at the sudden abnormality probability receiving unit from samples of the frequency distribution of the tool usage stored in the tool-usage-at-abnormality-diagnosis storing unit. Subsequently the relearning necessity determining unit is configured to apply remained samples to the logarithm normal distribution.

A computer readable medium storing a relearning necessity determination program of a leaned diagnostic model according to a seventh aspect of the disclosure is provided. The computer readable medium causes a control device of a machine tool to perform the relearning necessity determination method of the diagnostic model in the machine tool according to the first aspect. The control device includes a machining abnormality diagnosing unit configured to determine normal or abnormality of machining using the diagnostic model generated through machine learning.

With the disclosure, when the over-detection is suspected in machining abnormality diagnosis of the machine tool, whether the relearning of the diagnostic model is necessary or not can be appropriately determined.

DETAILED DESCRIPTION OF THE INVENTION

The following describes embodiments of the disclosure based on the drawings.

Figure 1:
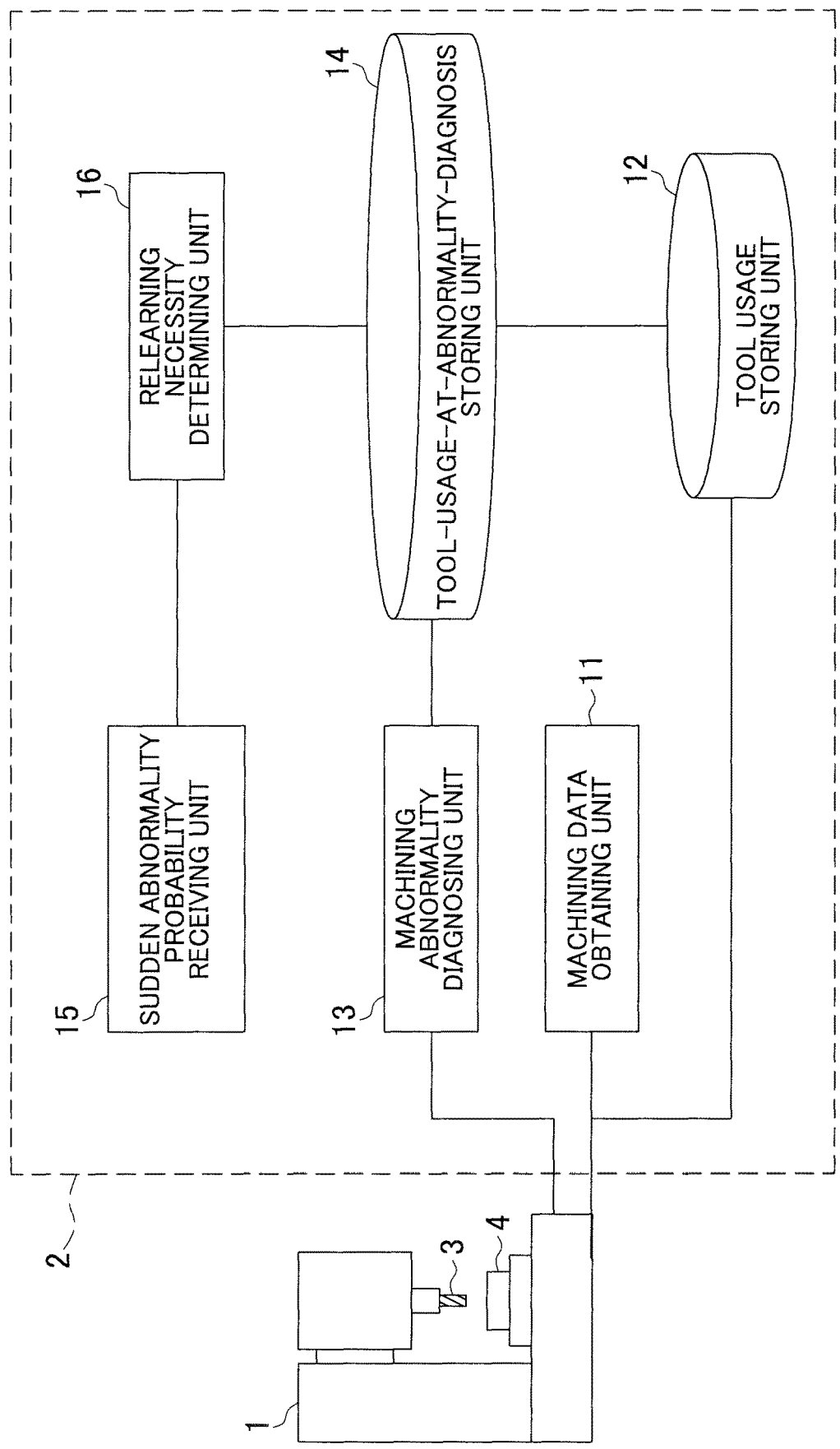
FIG. 1 is a block configuration diagram of a machine tool on which the disclosure is performed.

In FIG. 1, a tool 3 and a workpiece 4 are mounted to a machine tool 1, and a control device 2 controls the machine tool to process the workpiece.

To reduce a loss of the workpiece due to machining abnormality, the control device 2 includes a machining abnormality diagnosing unit 13. The machining abnormality diagnosing unit 13 receives data regarding machining from a machining data obtaining unit 11 and diagnoses presence/absence of abnormality using a learned diagnostic model (not illustrated). Additionally, in accordance with progress of the machining, a tool usage storing unit 12 stores cumulative usage (cutting time or a cutting distance) of the tool 3 as needed. A program stored in a storing unit of the control device 2 executes the processing and determination on necessity of relearning described later.

When the machining abnormality diagnosing unit 13 determines that the machining is abnormal, the machining abnormality diagnosing unit 13 transmits a stop signal to the machine tool 1 and notifies a tool-usage-at-abnormality-diagnosis storing unit 14 of the abnormality. The tool-usage-at-abnormality-diagnosis storing unit 14 obtains the tool usage at the time of receiving the notification from the tool usage storing unit 12 and stores it. After receiving the stop signal, the machine tool 1 once stops the machining for replacement of the tool and resumes the machining again. Then, the cumulative usage held by the tool usage storing unit 12 is reset at the same time.

At the time when there is a likelihood of over-detection in abnormality diagnosis, for example, when a person engaged in machining supplies spare tools, when a person in charge of purchase orders additional tools, or at periodic diagnosis, a relearning necessity determining unit 16 verifies validity of the diagnostic model. Then, as necessary, a proportion of the number of tools assumed to drop due to sudden abnormality before reaching the life may be received at a sudden abnormality probability receiving unit 15.

The following describes details of the determination method in the relearning necessity determining unit 16.

First, as a relational expression expressing life of a tool, the Taylor's equation for tool life (see Taylor, F. W.: "On the Art of Cutting Metals," Trans. ASME, Vol. 28, pp. 31-350 (1906)) is known. It has been known that, when taking a variation of progress of tool wear into consideration, the variation of the tool life to cutting time follows a logarithm normal distribution (see "Generalized Tool-Life Equation Based on Tool-Life Distributions," Shimoda, et al. Journal of Japan Industrial Management Association, Vol. 50, No. 1, pp. 50-57 (1999)).

From the points, it can be expected that when the progress of tool wear increases a degree of abnormality of machining, cutting time or a cutting distance at which the degree of abnormality reaches a certain value follows the logarithm normal distribution. In other words, when the frequency distribution of the tool usage when the machining abnormality diagnosing unit 13 determines the abnormality follows the logarithm normal distribution, it can be regarded that the diagnostic model matches the machining state and the relearning of the diagnostic model can be determined as unnecessary. On the other hand, when the frequency distribution does not follow the logarithm normal distribution, it suggests that the diagnostic model cannot express the machining state, and therefore, it can be determined that the relearning is necessary.

The known method can be appropriately used as the determination method whether the frequency distribution follows the logarithm normal distribution. Examples of the method include determination whether data has a straight line shape when tool life is plotted on the lateral axis and a cumulative probability of life on the vertical axis based on the logarithmic normal probability paper, and $x^2$ (chi-squared) test.

Figure 2:
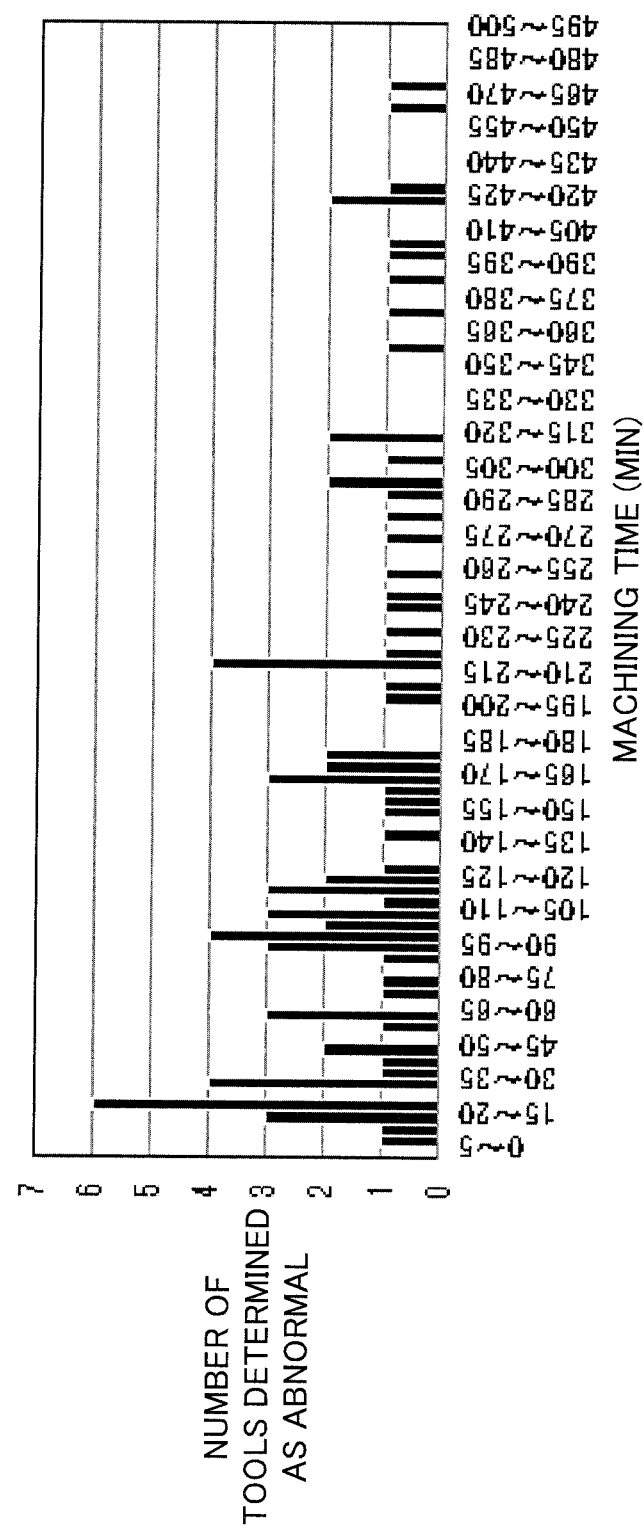
FIG. 2 is a drawing illustrating a frequency distribution of machining time in abnormality determination of 100 pieces of tools.

As an example, FIG. 2 illustrates the frequency distribution of the machining time in abnormality determination of 100 pieces of tools. In consideration based on the logarithmic normal probability paper, when a logarithm of the machining time is plotted on the lateral axis and an inverse function of a standard normal distribution to the cumulative probability is plotted on the vertical axis, in a case where the samples follow the logarithm normal distribution, the data are plotted in a straight line shape (the following equation).

$$\Phi^{-1}(F(x)) = \frac{\ln x - \mu}{\sigma} \qquad \text{[Expression 1]}$$

Here, x indicates a random variable (=machining time), μ indicates an average, α indicates a standard deviation, F(x) indicates a cumulative probability of x, and Φ indicates a cumulative probability of the standard normal distribution.

Figure 3:
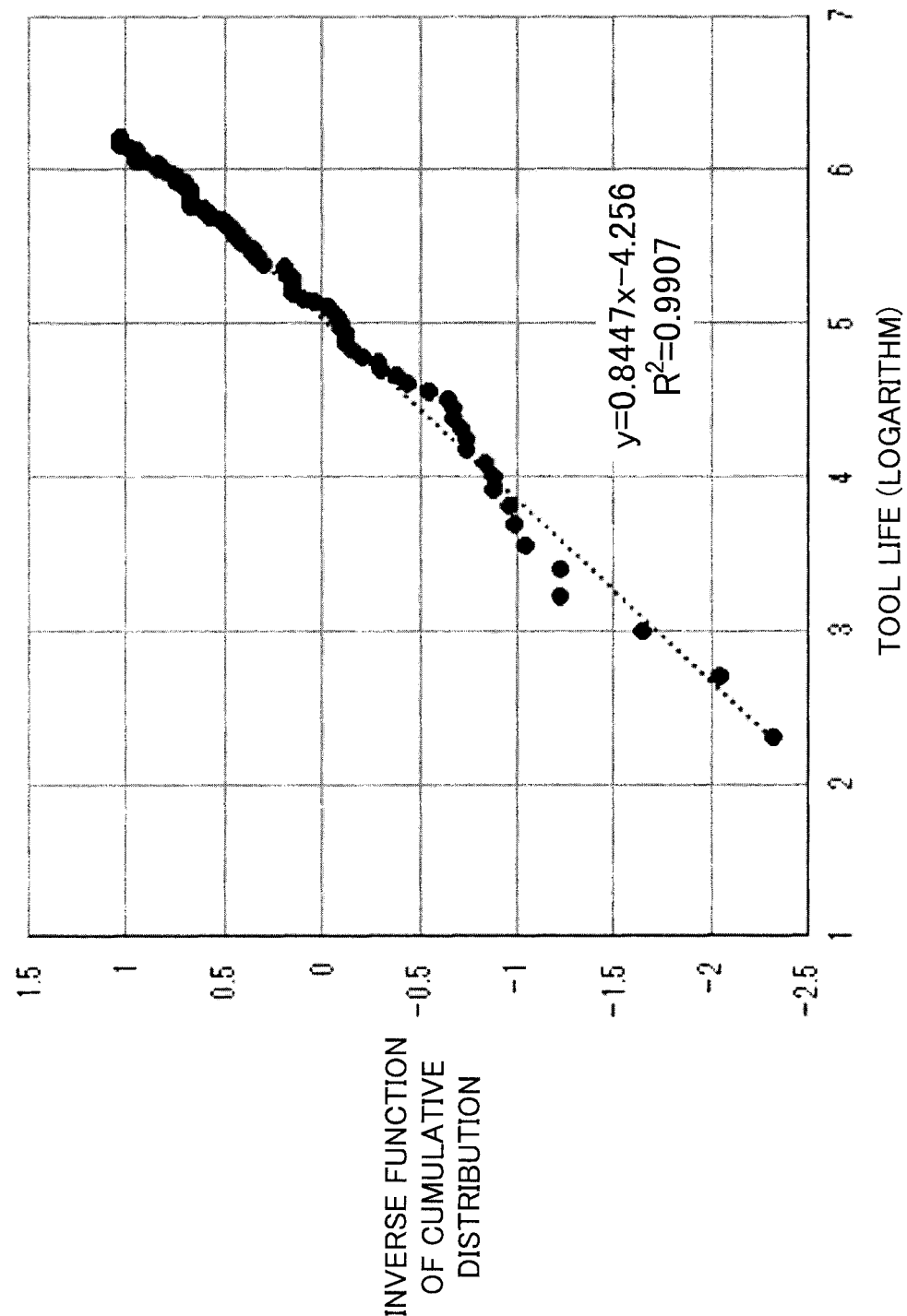
FIG. 3 is a drawing plotting the samples of FIG. 2 on a logarithmic normal probability paper.

FIG. 3 plots the samples of FIG. 2 in accordance with the description above. In the case, it is found that the approximation can be made well from the straight line illustrated by the dotted line, and the samples can be said to follow the logarithm normal distribution. For example, a certain value or more (for example, 0.99 or more) of a coefficient of determination (the $R^2$ value in FIG. 3) or the like can be employed as a determination reference.

The control device 2 (relearning necessity determination device) according to the configuration performs storing the machining time (cumulative cutting time) of the tool 3 mounted to the machine tool 1 in the tool usage storing unit 12 as the tool usage. The control device 2 also performs storing the tool usage when the machining abnormality diagnosing unit 13 diagnoses the machining as the machining abnormality in the tool-usage-at-abnormality-diagnosis storing unit 14. The control device 2 also performs determining the necessity of relearning of the diagnostic model by the relearning necessity determining unit 16 based on the frequency distribution of the tool usage stored in the storing of the tool usage. Accordingly, when there is a likelihood of over-detection in the machining abnormality diagnosis of the machine tool 1, whether the relearning of the diagnostic model is necessary can be appropriately determined.

In addition to reaching the tool life due to the progress of tool wear, a process reaching the machining abnormally possibly includes, for example, generation of sudden abnormality caused by biting of swarf to a cutting edge. Various causes, such as a quality of the machining condition and a supply state of cutting fluid, are conceivable as a cause of the sudden abnormality, and therefore the cause is not always correlated to the wear state of the tool. Thus, the machining abnormality caused by the sudden abnormality occurs in a distribution different from the above-described logarithm normal distribution. Accordingly, tools, which are remained after removal of tools where the sudden abnormality occurs, are applied to the logarithm normal distribution to allow further accurate determination on necessity of relearning.

Figure 4:
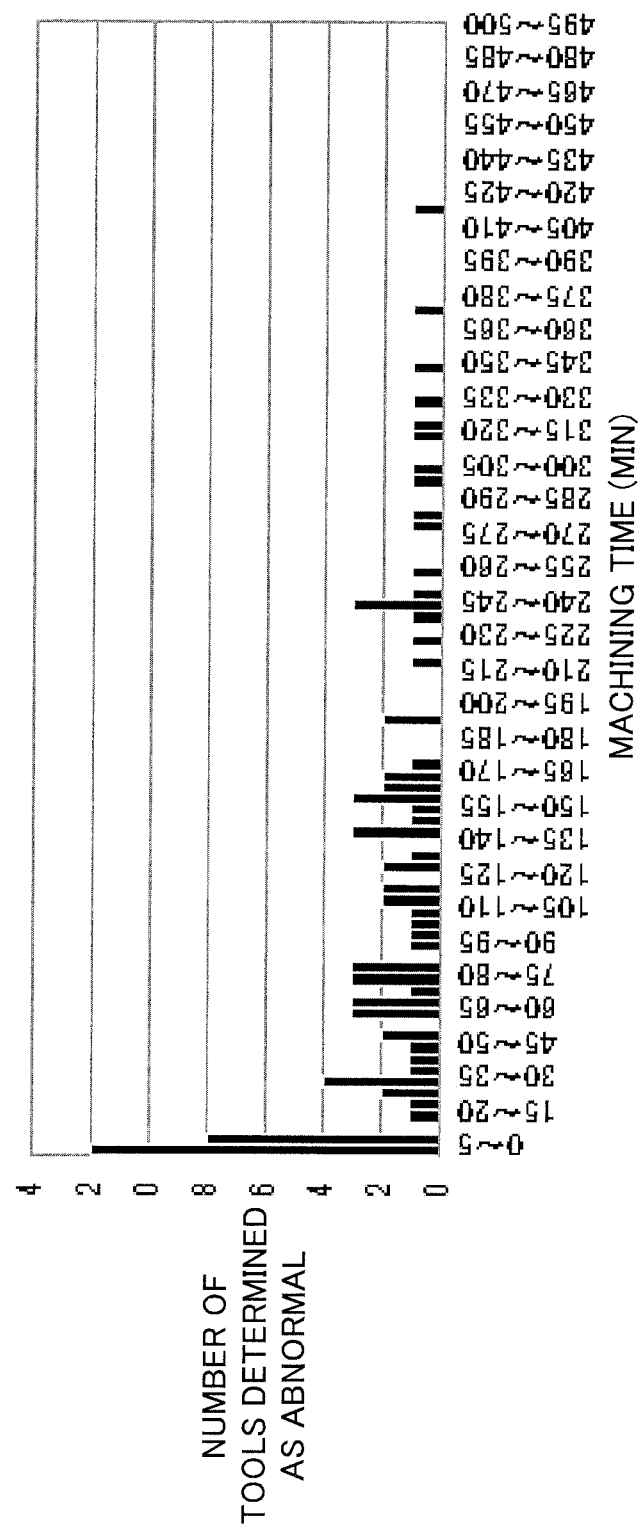
FIG. 4 is a drawing illustrating a frequency distribution of machining time in abnormality determination of 100 pieces of tools (including cases of sudden abnormality).
Figure 5:
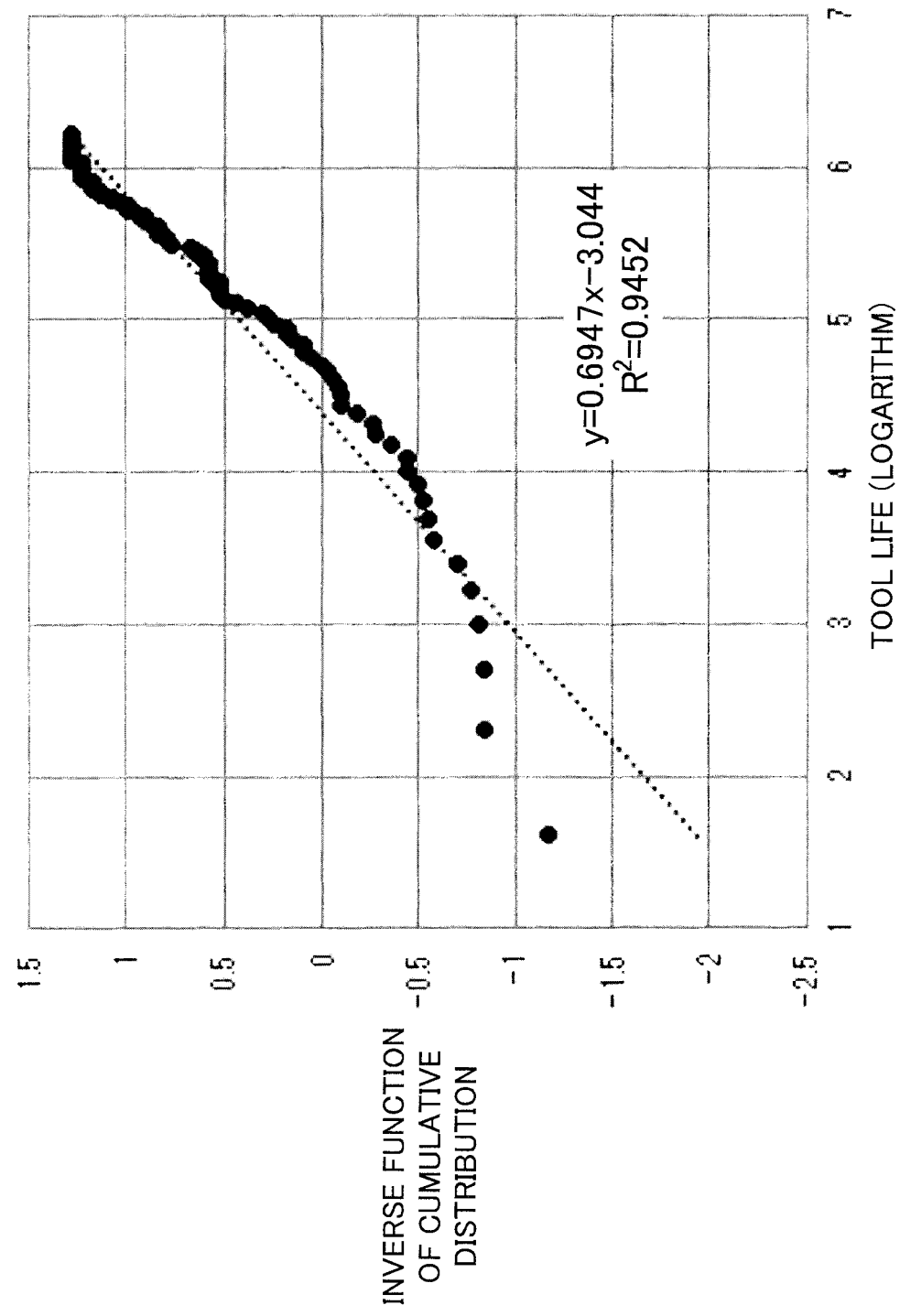
FIG. 5 is a drawing plotting the samples of FIG. 4 on a logarithmic normal probability paper.

For example, FIG. 4 similarly illustrates the frequency distribution of the machining time in abnormality determination of 100 pieces of tools. However, the case of FIG. 4 includes sudden abnormal cases, in addition to reaching the tool life due to the progress of wear. In the case, plotting on the logarithmic normal probability paper makes FIG. 5. In the case, the deviation from the straight line is large and the coefficient of determination is degraded.

Figure 6:
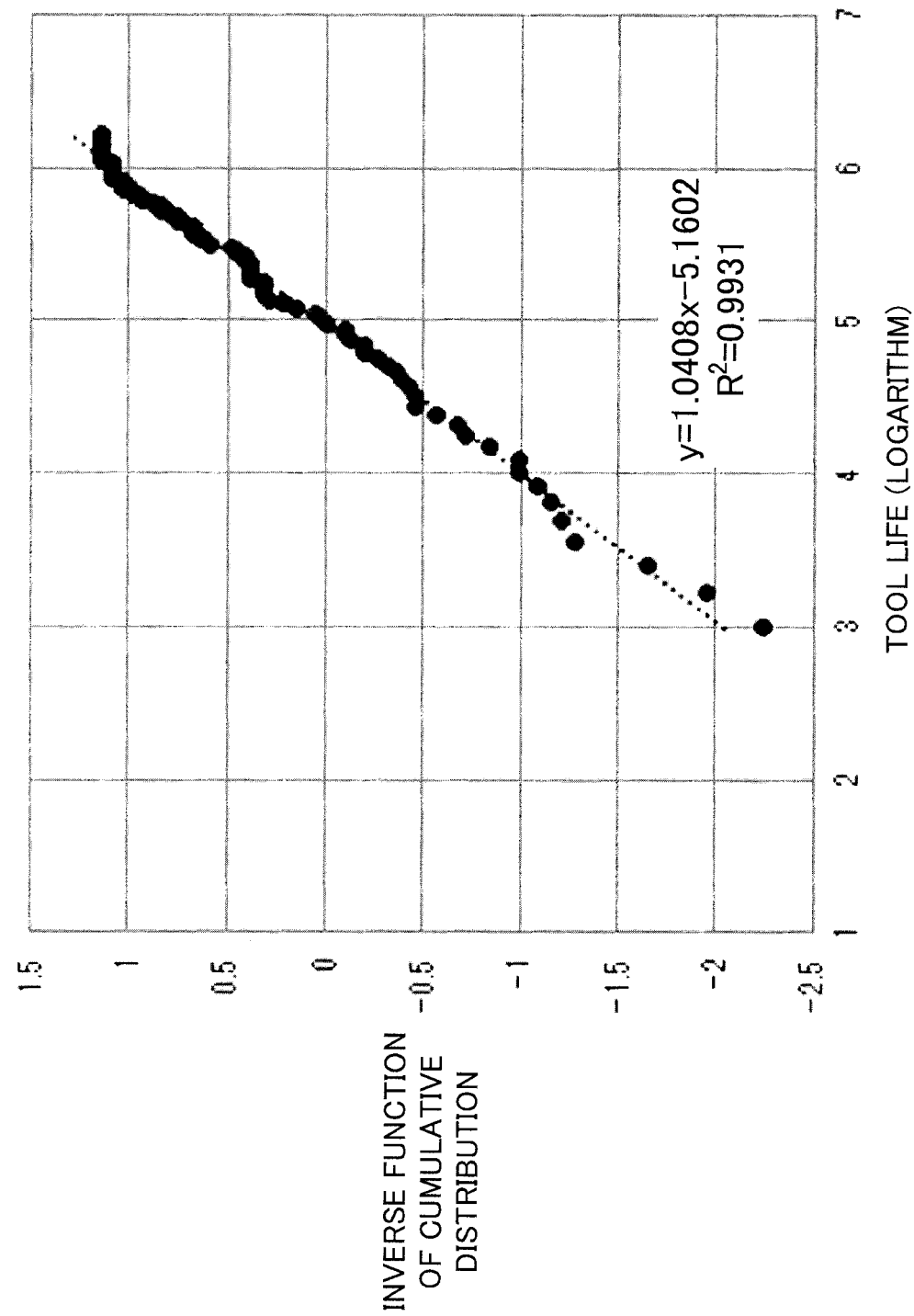
FIG. 6 is a drawing in which 20% of samples having shorter tool life are removed from the samples of FIG. 4 and remained samples are plotted again.

Here, for example, assume that it has been known from, for example, the past experience, that the sudden abnormality occurs in around 20% of tools among all tools. Since the sudden abnormality occurs earlier than wear, FIG. 6 illustrates a drawing in which 20% of samples having shorter tool life are removed and remained samples are plotted again. In the case, the line becomes an approximately straight line shape and also the coefficient of determination has the high value. Thus, in the case where the proportion of sudden abnormality can be preliminarily assumed, removing samples by an amount of the assumed proportion from the samples allows further appropriate determination.

When the linear approximation does not match even when the samples are removed by the assumed amount of sudden abnormality, it can be determined that the diagnostic model is inappropriate and the relearning is necessary.

Besides, while the cumulative cutting time is stored as the tool usage in the embodiment, the tool usage may be the cumulative cutting distance.

Additionally, while the relearning necessity determining unit is built into the control device of the machine tool, the relearning necessity determining unit may be placed outside the machine tool, for example, in the form of an external PC and application on a cloud. In the case, the necessity of relearning of a plurality of machine tools can be concurrently determined.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A relearning necessity determination method of determining a necessity of relearning of a learned diagnostic model in a machine tool including a machining abnormality diagnosing unit, the machining abnormality diagnosing unit determining normality or abnormality of machining using the diagnostic model generated through machine learning, the method comprising:
    storing a cumulative cutting time or a cumulative cutting distance of a tool mounted to the machine tool as a tool usage;
    storing the tool usage when the machining abnormality diagnosing unit diagnoses the machining as machining abnormality; and
    determining the necessity of the relearning of the diagnostic model based on a frequency distribution of the tool usage stored in the storing of the tool usage.

2. The relearning necessity determination method according to claim 1, wherein
    in the determining of the necessity, when the frequency distribution of the tool usage stored in the storing of the tool usage follows a logarithm normal distribution, the relearning of the diagnostic model is determined as unnecessary.

3. The relearning necessity determination method according to claim 2, wherein
    before performing the determining of the necessity, receiving input of an assumed probability of occurrence of sudden machining abnormality, and
    in the determining of the necessity, samples by an amount of the assumed probability received at the receiving input are preliminarily removed from samples of the frequency distribution of the tool usage stored in the storing of the tool usage, and remained samples are applied to the logarithm normal distribution.

4. A computer readable medium storing a relearning necessity determination program of a leaned diagnostic model for causing a control device of a machine tool to perform the relearning necessity determination method of the diagnostic model in the machine tool according to claim 1, the control device including a machining abnormality diagnosing unit configured to determine normal or abnormality of machining using the diagnostic model generated through machine learning.

5. A relearning necessity determination device that determines a necessity of relearning of a learned diagnostic model in a machine tool, the device comprising:
    a machining abnormality diagnosing unit configured to determine normality or abnormality of machining using the diagnostic model generated through machine learning;
    a tool usage storing unit configured to store a cumulative cutting time or a cumulative cutting distance of a tool mounted to the machine tool as a tool usage;
    a tool-usage-at-abnormality-diagnosis storing unit configured to store the tool usage when the machining abnormality diagnosing unit diagnoses the machining as machining abnormality; and
    a relearning necessity determining unit configured to determine the necessity of the relearning of the diagnostic model based on a frequency distribution of the tool usage stored in the tool-usage-at-abnormality-diagnosis storing unit.

6. The relearning necessity determination device according to claim 5, wherein
    the relearning necessity determining unit is configured such that when the frequency distribution of the tool usage stored in the tool-usage-at-abnormality-diagnosis storing unit follows the logarithm normal distribution, the relearning necessity determining unit determines that the relearning of the diagnostic model is unnecessary.

7. The relearning necessity determination device according to claim 6, further comprising
    a sudden abnormality probability receiving unit configured to receive input of an assumed probability of occurrence of sudden machining abnormality, wherein
    the relearning necessity determining unit is configured to preliminarily remove samples by an amount of the assumed probability received at the sudden abnormality probability receiving unit from samples of the frequency distribution of the tool usage stored in the tool-usage-at-abnormality-diagnosis storing unit, and subsequently the relearning necessity determining unit is configured to apply remained samples to the logarithm normal distribution.

\* \* \* \* \*